United States Patent [19]
Nomura

[11] Patent Number: 5,238,335
[45] Date of Patent: Aug. 24, 1993

[54] REAMER

[75] Inventor: Takuji Nomura, Nishinomiya, Japan

[73] Assignee: Toshiba Tungaloy Co., Ltd., Kanagawa, Japan

[21] Appl. No.: 863,569

[22] Filed: Apr. 6, 1992

Related U.S. Application Data

[63] Continuation-in-part of Ser. No. 344,103, Apr. 18, 1989, abandoned, which is a continuation-in-part of Ser. No. 204,864, Jun. 10, 1988, abandoned.

[30] Foreign Application Priority Data

Jun. 11, 1987 [JP] Japan ............................ 62-89885[U]

[51] Int. Cl.$^5$ ............................................. B23B 51/02
[52] U.S. Cl. .................................... 408/59; 408/199; 408/705
[58] Field of Search ...................... 408/59, 81, 83, 188, 408/199, 200, 233, 705, 713

[56] References Cited

U.S. PATENT DOCUMENTS

| | | |
|---|---|---|
| 2,188,584 | 1/1940 | Tyne . |
| 2,815,688 | 12/1957 | Forbes et al. . |
| 2,867,140 | 1/1959 | Getts . |
| 3,387,511 | 6/1968 | Ackart, Sr. et al. . |
| 3,521,507 | 7/1970 | Yogus et al. . |
| 3,591,305 | 7/1971 | Aichhorn et al. . |
| 4,125,342 | 11/1978 | Kress . |
| 4,279,550 | 7/1981 | Kress et al. . |
| 4,284,375 | 8/1981 | Muhleisen . |
| 4,293,252 | 10/1981 | Kress et al. . |
| 4,353,669 | 10/1982 | Striegl . |
| 4,547,102 | 10/1985 | Millington et al. . |
| 4,596,498 | 6/1986 | Kress ................................. 408/83 |

FOREIGN PATENT DOCUMENTS 61-184611 8/1986 Japan .
2110129A 6/1983 United Kingdom .

Primary Examiner—Daniel W. Howell
Attorney, Agent, or Firm—Sixbey, Friedman, Leedom & Ferguson

[57] ABSTRACT

A reamer includes a shank portion and a reamer head fixed to the shank portion. A cutting blade is mounted on the reamer head to project axially forwardly from the front end of the reamer head. A bearing guide pad is mounted on the reamer head circumferentially spaced from the cutting blade downstream with respect to the rotating direction of the reamer, and a sizing guide pad is mounted on the reamer head substantially diametrically opposed to the cutting blade. The axial lengths (L2) of the guide surfaces of the bearing guide pad and the sizing guide pad are both not larger than the axial length (L1) of the circle land of the cutting blade, the axial length (L1) of the cutting blade is not larger than the diameter (D) of the reamer, and the width (W2) of the sizing guide pad is not larger than the width (W1) of the bearing guide pad. The axial lengths (L2) of the guide surfaces of the guide pads are preferably 5 mm to 15 mm where the diameter of the reamer is 5 mm to 100 mm.

10 Claims, 7 Drawing Sheets

REAMER

This application is a continuation-in-part application of application Ser. No. 344,103 filed Apr. 18, 1989, now abandoned which is a continuation-in-part application of application Ser. No. 204,864 filed Jun. 10, 1988, now abandoned.

BACKGROUND OF THE INVENTION

1. Field of the Invention

This invention relates to a reamer for precision finishing a rough drilled bore in a metal workpiece.

2. Description of the Prior Art

There has been known a reamer comprising a shank portion, a reamer head adapted to be removably fixed to the shank portion, a cutting blade provided on the reamer head to project axially forwardly from the front end of the reamer head, a bearing guide pad provided on the reamer head circumferentially spaced from the cutting blade by 90°, and a sizing guide pad provided on the reamer head diametrically opposed to the cutting blade as disclosed in U.S. Pat. Nos. 3,880,545; 4,076,445 and 4,125,342 and Japanese Unexamined Utility Model Publication No. 61(1986)-184611, for example. The bearing guide pad bears the main cutting force of the cutting blade and the sizing guide pad together with the cutting blade determines the diameter of the bore to be drilled by the reamer, that is, the diameter of the bore depends on the distance between the outer edge of the sizing guide pad and the cutting edge of the cutting blade Further, the guide pads serve to burnish the cylindrical wall of the drilled bore.

Since the reamer is for precision finishing a rough drilled bore, the roundness and straightness of the bore finished by the reamer are required to be high and the diameter of the bore must be within a narrow limit. Conventionally, it has been considered that such requirements can be met by elongating the guide pads in the axial direction of the reamer. However, it has been found that, though the straightness and the roundness of the reamed bore can be improved to some extent by elongating the guide pads, it is limited and the requirements can be better met by making the guide pads shorter than the axial length of the cutting blade rather than elongating the guide pads. It may be considered that this is because, when the axial lengths or the guide pads are large, the frictional resistance between the guide pads and the wall of the bore increases as the reaming progresses to exert a strong radial constraining force on the reamer which acts as an adverse component on the reamer overcoming the thrust constraining force and the cutting force exerted by the cutting edge, whereby the straightness and the roundness of the reamed bore are deteriorated as well as the precision of the diameter of the reamed bore.

In other words, the tolerance of the deviation in the inclination of the reamer can be enlarged by making the axial length of the guide pads and circle land of the cutting blade small to reduce the constraining force on the reamer of the inner wall of the bore which is being reamed and enable the reaming of the bore having high roundness and straightness.

Further, the roundness of the reamed bore can be improved by making the width of the sizing guide pad narrower than that of the bearing guide pad.

SUMMARY OF THE INVENTION

In view of the foregoing observations and description, the primary object of the present invention is to provide a reamer which can finish a bore with a better straightness, a better roundness and better precision of the diameter of the bore.

In accordance with the present invention, there is provided a reamer comprising a shank portion, a reamer head fixed to the shank portion, a cutting blade provided on the reamer head to project axially forwardly from the front end of the reamer head, a bearing guide pad provided on the reamer head circumferentially spaced from the cutting blade downstream with respect to the rotating direction of the reamer, and a sizing guide pad provided on the reamer head substantially diametrically opposed to the cutting blade, characterized in that the axial lengths of the guide surfaces of the bearing guide pad and the sizing guide pad are both not larger than the axial length of the circle land of the cutting blade, the axial length of the circle land of the cutting blade is not larger than the diameter of the reamer, and the width of the sizing guide pad is not larger than the width of the bearing guide pad.

In accordance with the result of our examination, the longer the axial length of the guide margin of the surfaces of the guide pads and the longer the axial length of the cutting blade, the greater the axial contact with the bored wall will be. Accordingly, the shorter the axial length of the guide margin of the surfaces of the guide pads and the shorter the axial length of the cutting blade, the lesser the axial contact with the bored wall will be. The greater the axial contact, the greater the radial constraining force exerted by the bored wall. Consequently, the radial movement of the reamer will be more restricted with axially longer pads, which will, in turn, restrict the axial movement of the reamer. Thus, the reamer having axially shorter guide pads can advance into the bore without being loaded with a component which can adversely affect the straightness, the roundness and the precision of the diameter of the reamed bore.

In order to further reduce the radial constraining force on the guide pads, it is preferred that the guide pads are brought into line contact with the bore wall in the circumferentially direction at the front edges thereof. For this purpose, it is preferred that each of the guide pads is provided with a back-tapered guide surface, that is, a guide surface the height of which (i.e., the distance of the guide surface from the rotational axis of the reamer) reduces toward the shank portion.

Further, in accordance with the result of our experiment, when the width of the guide surface of the bearing guide pad is larger than that of the guide surface of the sizing guide pad, the straightness and the precision of the diameter of the reamed bore can be further improved in addition to the roundness thereof.

Furthermore, in the reamers having a diameter of 5-100 mm, the axial lengths of the guide surfaces of the guide pads are preferably 5-15 mm. The diameter of the reamer is normally 5-40 mm in case of brazed reamers and 25-100 mm in case of indexable reamers.

DESCRIPTION OF THE PREFERRED EMBODIMENT

In FIGS. 1a to 1d, a reamer in accordance with an embodiment of the present invention includes a reamer head 11. A cutting blade 12 is mounted on the reamer head 11 to project forward from the front end of the reamer head 11. A bearing guide pad 13 is mounted on the reamer head 11 circumferentially spaced from the cutting blade 12 generally by 15°–85°, and a sizing guide pad 14 is mounted on the reamer head 11 diametrically opposed to the cutting blade 12. The cutting blade 12 has a chamfer 12a and land 12b. The cutting blade 12 further includes axial and radial rake angles in the range of −6° to +10°, with the particular rake angle being dependent upon the material from which the cutting blade is formed, the required level of the surface finish and the depth of the cut to be made. The axial lengths L2 of the guide surfaces 15 of the bearing guide pad 13 and the sizing guide pad 14 are both not larger than the axial length L1 of the circle land 15 of the cutting blade 12, and in this embodiment are not shorter than 5 mm and not longer than 15 mm. Preferably they are not longer than 5 mm and not shorter than 10 mm. The width W1 of the bearing guide pad 13 which bears the main cutting force of the cutting blade 12 is selected to be 6 to 12 mm when the diameter D of the reamer head 11 is 30 mm. The width W2 of the sizing guide pad 14 which determines the diameter of the reamed bore is selected to be 2 to 8 mm. Each of the guide pads 13 and 14 is provided with a back taper of about 10 μm when its axial length is 10 mm. That is, the height of the guide surface 15 of the guide pad 14 is gradually reduced by 10 μm from the front edge 14a toward the rear edge so that the guide pad 14 is substantially brought into line contact with the bore wall in the circumferential direction at the front edge 14a. Similarly, the height of the guide surface 15 of the guide pad 13 is gradually reduced by 10 μm from the front edge 13a toward the rear edge thereof so that the guide pad 13 is substantially brought into line contact with the bore wall in the circumferential direction at the front edge 13a.

A shank portion 16 is fixed to the rear end of the reamer head 11 by screwing the front end portion of the shank portion 16 into a threaded socket portion 19 in the rear end of the reamer head 11. Reference numerals 20, 21 and 22 denote oil passages formed through the reamer 11 and the shank portion 16 to supply cutting oil to the cutting position.

Figure 1A:
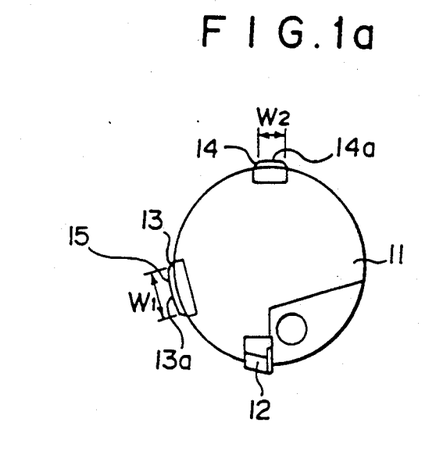
FIG. 1a is a front view showing a reamer in accordance with an embodiment of the present invention.
Figure 1B:
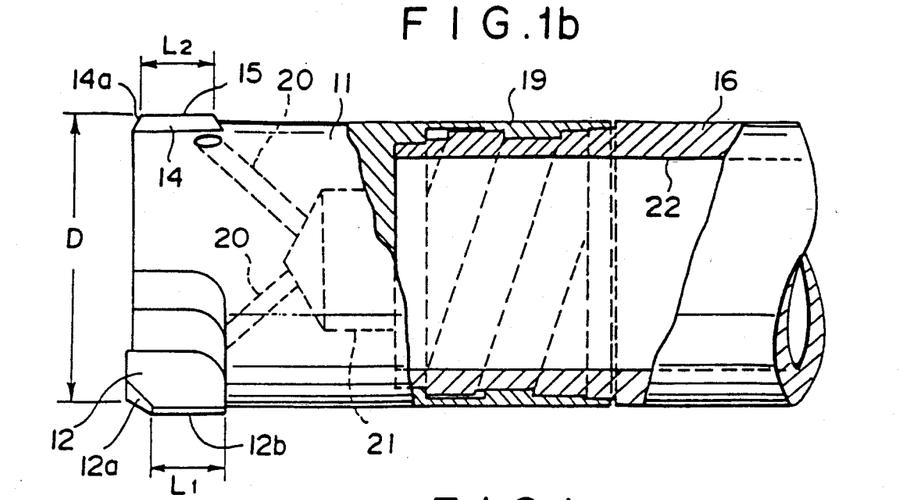
FIG. 1b is a partially sectional side view of the reamer shown in FIG. 1a, FIG. 1c is a partially sectional side view of the reamer head of the reamer as shown in FIG. 1b.
Figure 1C:
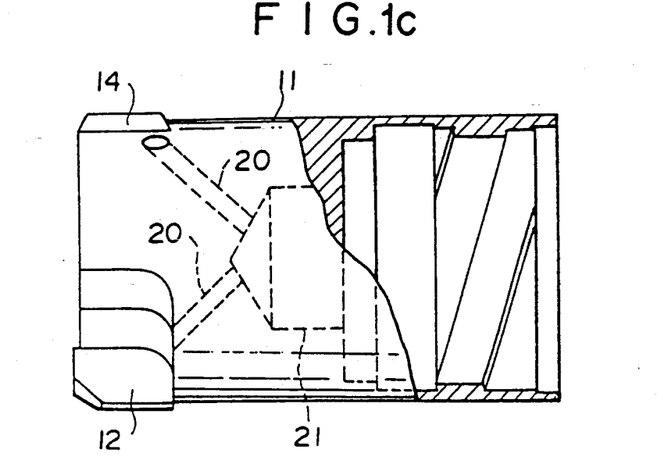
Figure 1D:
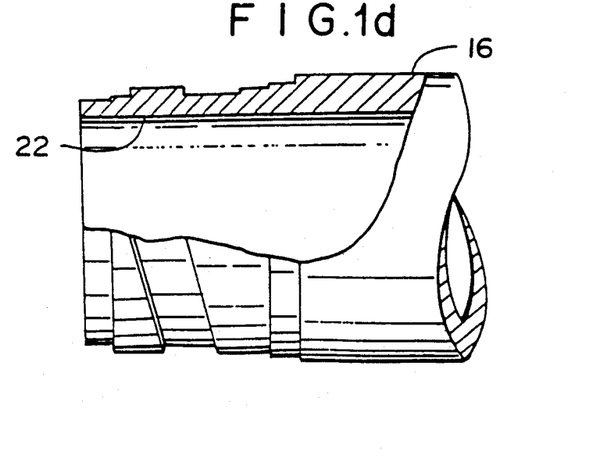
FIG. 1d is a partially sectional side view of the shank portion of the reamer as shown in FIG. 1b.
Figure 2:
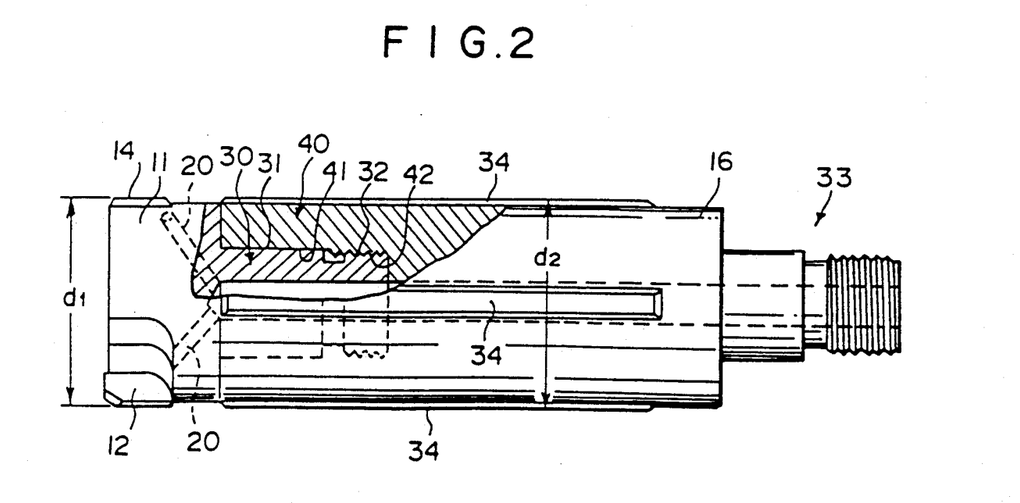
FIG. 2 is a side view showing a reamer in accordance with another embodiment of the present invention.

FIG. 2 shows another embodiment of the present invention. The reamer of this embodiment is substantially the same as shown in FIGS. 1a to 1d in the structure of the cutting blade 12 and the guide pads 13 and 14 (though guide pad 13 is not shown in FIG. 2), and accordingly, the parts analogous to the parts shown in FIGS. 1a to 1d are given the same reference numerals and only the difference therebetween will be mainly described, hereinbelow. The reamer head 11 in this embodiment is provided with spigot joint portion 30 on the rear end portion while the shank portion 16 is provided with a socket joint portion 40, and the spigot joint portion 30 is adapted to be snugly fitted into the socket joint portion 40. The spigot joint portion 30 comprises a snug fit portion 31 formed at the base portion thereof and a threaded portion 32 formed on the free end portion thereof. The socket joint portion 40 comprises a snug fit portion 41 formed near the open end thereof and a threaded portion 42 formed near the bottom thereof. The reamer head 11 is fixed to the shank portion 16 by way of engagement between the respective threaded portions 32 and 42 and engagement between the respective snug fit portions 31 and 41. This ensures that the reamer head 11 is fixed to the shank portion 16 in precise alignment therewith. Further, the shank portion 16 is provided at the rear end thereof with a spigot joint portion 33 which is identical to the spigot joint portion 30 of the reamer head 11. This permits connection of the shank portion 16 to an extension shank or to a driving mechanism.

Further, the shank portion 16 in this embodiment is provided with auxiliary guide pads 34 circumferentially spaced from each other by 90°, each extending in the axial direction and being relatively long. The auxiliary guide pads 34 serves to prevent deflection of the shank portion 16 which can adversely affect the straightness. The auxiliary pads 34 are particularly effective when the bore to be reamed is deep. It is important that the guiding diameter d2 determined by the distance between the outer surfaces of the diametrically opposed auxiliary guide pads 34 or the distance between the outer surfaces of the auxiliary guide pads and the rotational axis of the shank portion 16 is set to be smaller than the cutting diameter d1 determined by the distance between the outer surface of the front edge 14a of the sizing guide pad 14 by about several mm so that substantially no radial constraining force is exerted on the guide pads from the bore wall. The auxiliary pads 34 need not be provided with a back taper.

Using a reamer in accordance with the embodiment shown in FIG. 2, a rough drilled bore in a workpiece (JIS S55C) was reamed. Cutting rate was 100 m/min, feed rate was 0.5 mm./rev, and water-insoluble cutting oil was used. The straightness of the reamed bore was excellent and exhibited fine displacement of 0.008 mm for a cutting diameter of 18 mm and an axial cutting depth of 1 mm. The roundness was also excellent and the hole tolerance was about H7.

Figure 3A:
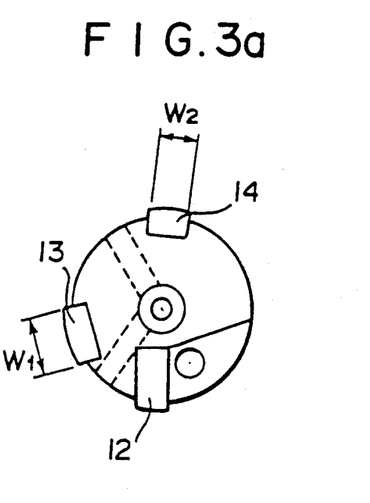
FIG. 3a is a front view showing a reamer in accordance with still another embodiment of the present invention.
Figure 3B:
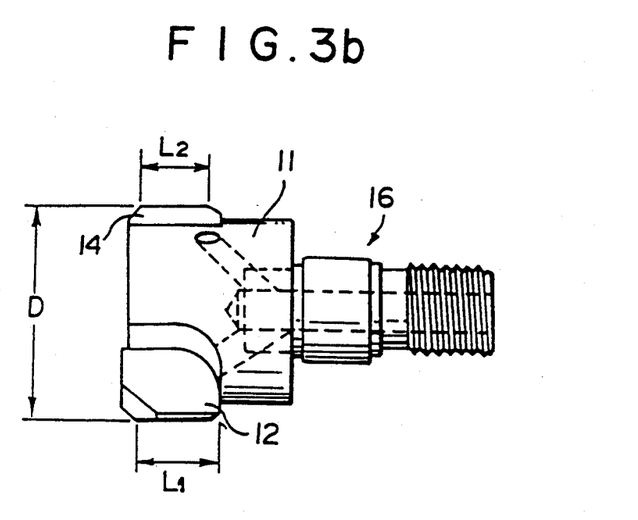
FIG. 3b is a side view of the reamer shown in FIG. 3a, FIGS. 4a and 4b are graphs for illustrating the result of the invention.

Using a reamer as shown in FIGS. 3a and 3b, the roundness of the reamed bore was measured for various lengths L2 of the guide pads with the widths W1 and W2 of the bearing guide pad and sizing guide pad and the reamer diameter being changed. The reamer shown in FIGS. 3a and 3b is substantially the same as that shown in FIGS. 1a to 1d except that the shank portion 16 is smaller in diameter than the reamer head 11, and accordingly, the parts analogous to the parts shown in FIGS. 1a and 1b are given the same reference numerals and will not be described here. The workpiece was of material defined by JIS S45C, the depth of the reamed bores were 50 mm when using a brazed reamer having the diameter of 8 mm, and 150 mm when using an indexable reamer having the diameter of 40 mm, the cutting rate was 110 m/min, the feed rate was 0.14 mm/rev. and 1:5 aqueous emulsion was used as the cutting oil. The results are as shown in FIGS. 4a and 4b.

Figure 4A:
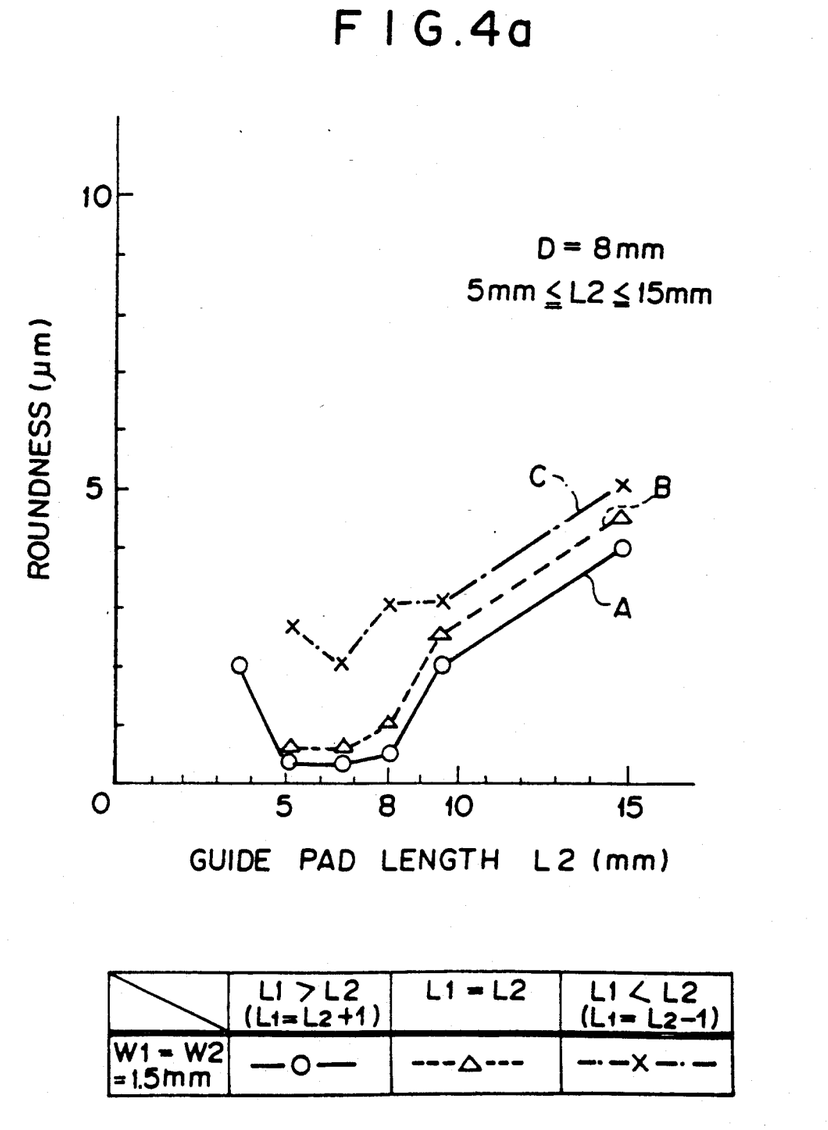

In FIG. 4a, the diameter D of the brazed reamer is 8 mm, and the width W1 of the bearing guide pad 13 and the width W2 of the sizing guide pad 14 are both 1.5 mm. The lines A, B and C represent the relation between the roundness and the guide surface lengths L2 in which line A shows the result in the case where the length L1 is larger than the lengths L2 by 1 mm, line B represents that in the case where the length L1 is equal to the lengths L2, line C represents that in the case where the lengths L1 are shorter than the length L2 by 1 mm.

Figure 4B:
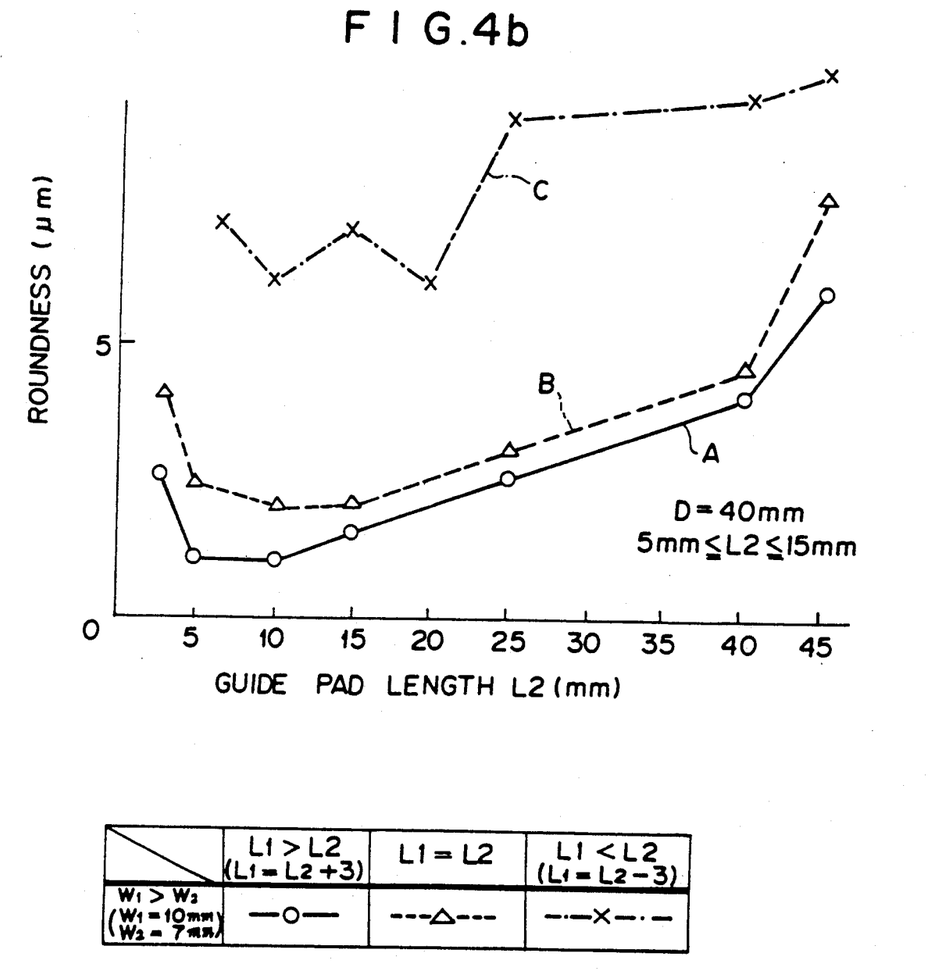
Figure 5A:
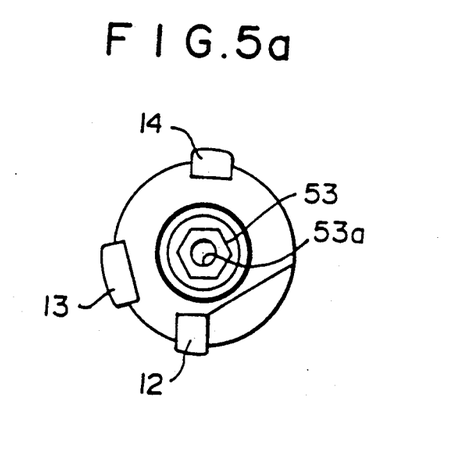
FIG. 5a is a front view showing a reamer in accordance with still another embodiment of the present invention.
Figure 5B:
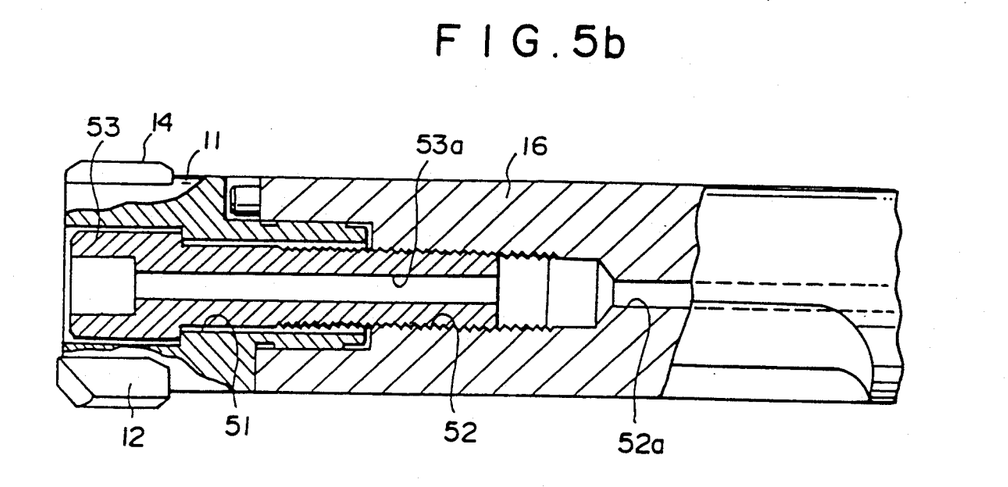
FIG. 5b is a side view partially in section of the reamer shown in FIG. 5a, FIG. 5c is a side view of the reamer head of the reamer as shown in FIGS. 5a and 5b.
Figure 5C:
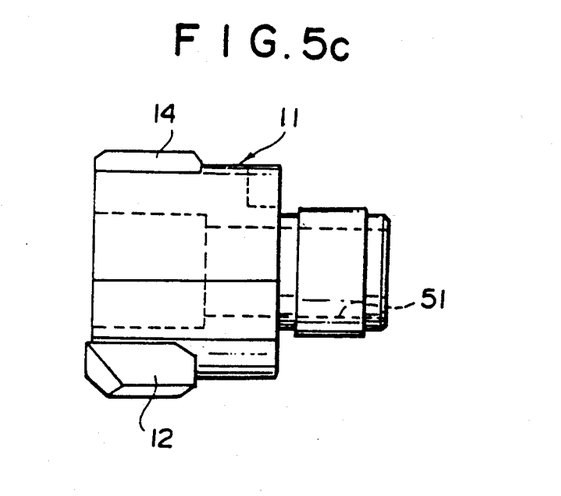
Figure 5D:
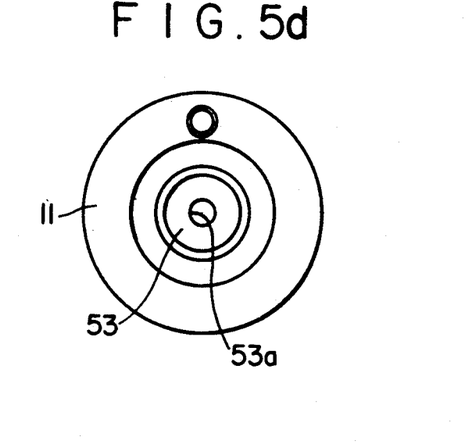
FIG. 5d is a rear view of the reamer head and the bolt of the reamer as shown in FIGS. 5a and 5b.
Figure 5E:
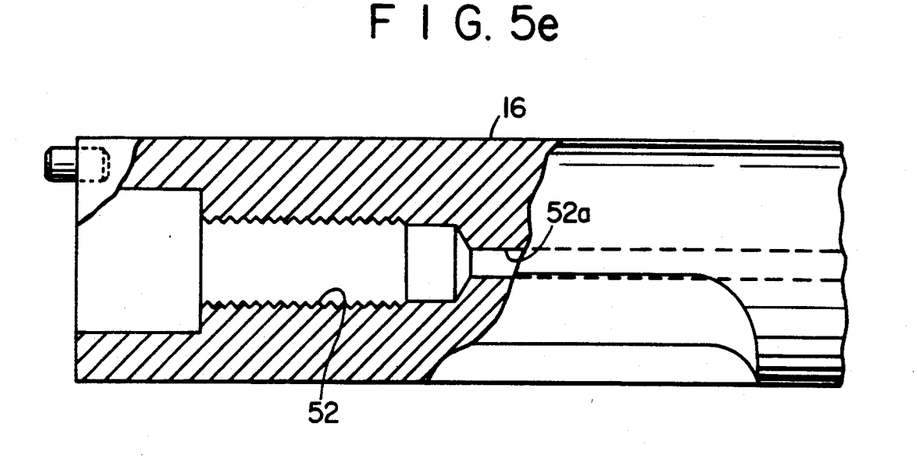
FIG. 5e is a partially sectional side view of the shank portion of the reamer as shown in FIGS. 5a and 5b.
Figure 5F:
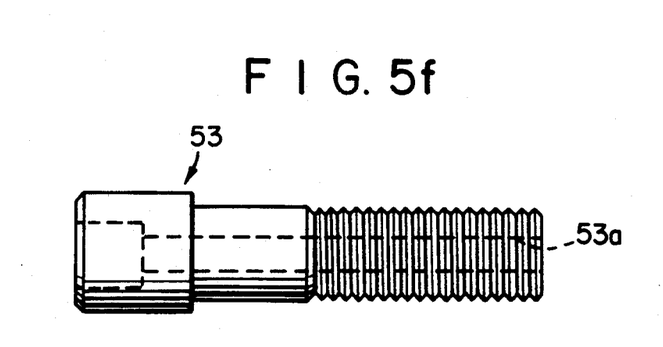
FIG. 5f is a side view of the bolt 53 of the reamer as shown in FIGS. 5a and 5b.

In FIG. 4b, the diameter D of the indexable reamer is 40 mm, and the width W1 of the bearing guide pad 13 is 10 mm and is larger than the width W2 of the sizing guide pad 14 which is 7 mm. The lines A, B and C represent the relation between the roundness and the guide surface lengths L2 in which line A shows the result in the case where the length L1 is larger than the lengths L2 by 3 mm, line B represents that in the case where the length L1 is equal to the lengths L2, line c represents that in the case where the lengths L1 are shorter than the length L2 by 3 mm.

As can be seen from FIGS. 4a and 4b, when the lengths L2 of the guide surfaces become longer than the length L1, the roundness was markedly deteriorated irrespective of the reamer diameter D and the widths W1 and W2. Further, as can be seen from comparison of the lines A to C in FIG. 4a with those in FIG. 4b, better roundness was obtained when the width W1 of the bearing guide pad 13 is larger than the width W2 of the sizing guide pad 14.

Hence, the conditions for obtaining the aimed result are summarized as follows.

$L1 \geq L2$
$D \geq L1$
$W1 \geq W2$

When all these conditions are satisfied, the object of this invention can be accomplished. Further, in the practical examples, where the diameter (D) of the reamer is 5-100 mm (5 mm $\leq D \leq$ 100 mm), 5 mm $\leq L \leq$ 15 mm is the desirable condition. If the axial lengths L2 of the guide pads 13, 14 are too small, the roughness of the reamed surface cannot be maintained at an allowable level, particularly when the guide pads are abrazed. Practically, the axial lengths L2 of the guide pads are desired to be not less than 5 mm.

FIGS. 5a to 5f show still another embodiment of the present invention. The reamer of this embodiment differs from those of the preceding embodiments mainly in the connection of the reamer head 11 to the shank portion 16. That is, the reamer head 11 is provided with a central bore 51 extending in the axial direction and the shank portion 16 is provided with a threaded central bore 52 extending in the axial direction. The reamer head 11 is fixed to the shank portion 16 by screwing a bolt 53 extending through the central bore 5 of the reamer head 11 into the central bore 52 of the shank portion 16 and tightening the reamer head 11 to the shank portion 16. A passage for cutting oil is defined by a central bore 53a formed through the bolt 53 and a small diameter central bore 52a formed in the shank portion 16 in communication with the threaded central bore 51.

Coolant is supplied through the central bores 52a, 53a and is discharged through chip channels formed outside the shank portion together with the coolant.

What is claimed is:

1. A reamer comprising a shank portion, a reamer head fixed to the shank portion, a cutting blade having a chamfer and a circle land forming an outer surface of said cutting blade, said cutting blade being positioned on the reamer head to project axially forwardly from a front end of the reamer head, a bearing guide pad provided on the reamer head circumferentially spaced from the cutting blade downstream with respect to a rotating direction of the reamer, and a sizing guide pad provided on the reamer head substantially diametrically opposed to the cutting blade, wherein the axial lengths of the guide surfaces of the bearing guide pad and the sizing guide pad are both not larger than the axial length of the circle land of the cutting blade, the axial length of the circle land of the cutting blade is not larger than the diameter of the reamer, and the width of the sizing guide pad is not larger than the width of the bearing guide pad.

2. A reamer as defined in claim 1, wherein each of said guide pads is provided with a back-tapered guide surface.

3. A reamer as defined in claim 2, wherein said shank portion is provided with a plurality of auxiliary guide pads circumferentially spaced from each other and extending in the axial direction, heights of the auxiliary guide pads being such that the guiding diameter determined by the distance between the outer surfaces of the auxiliary guide pads and the rotational axis of the shank portion is smaller than the cutting diameter determined by the distance between the outer surface of the sizing guide pad and the outer surface of the cutting blade.

4. A reamer as defined in claim 1, wherein one of said reamer head and the shank portion is provided with a socket joint portion and the other is provided with a spigot joint portion, the spigot joint portion comprising a snug fit portion formed at the base portion thereof and a threaded portion formed on the end portion thereof remote from the base portion, the socket joint comprising a snug fit portion formed near the open end thereof and a threaded portion formed near the bottom thereof, and the reamer head being removably fixed to the shank portion by way of engagement between the respective threaded portions and engagement between the respective snug fit portions.

5. A reamer as defined in claim 1, wherein said shank portion is provided with a threaded central bore axially extending therethrough and said reamer head is removably fixed to said shank portion by a screw bolt screwed into the threaded central bore of said shank portion through a central bore extending axially through said reamer head.

6. A reamer as defined in claim 5, wherein said bolt is provided with a central bore axially extending therethrough and the shank portion is provided with a small diameter bore in communication with said threaded central bore thereof, the central bore in the bolt and the small diameter bore in the shank portion defining a passage for cutting oil.

7. A reamer as defined in claim 1, wherein said axial lengths of the guide surfaces of the bearing guide pad and the sizing guide pad are 5 mm to 15 mm where the diameter of the reamer is 5 mm to 100 mm.

8. A reamer as defined in claim 1, wherein said cutting blade includes axial and radial rake angles in the range of −6° to 10°.

9. A reamer comprising a shank portion, a reamer head fixed to the shank portion, a cutting blade having a chamfer and a circle land forming an outer surface of said cutting blade, said cutting blade being positioned on the reamer head to project axially forwardly from a front end of the reamer head, a bearing guide pad provided on the reamer head circumferentially spaced from the cutting blade downstream with respect to a rotating direction of the reamer, and a sizing guide pad provided on the reamer head substantially diametrically opposed to the cutting blade, wherein said shank portion is provided with a plurality of auxiliary guide pads circumferentially spaced from each other and extending in the axial direction, heights of the auxiliary guide pads being such that the guiding diameter determined by the distance between the outer surfaces of the auxiliary guide pads and the rotational axis of the shank portion is smaller than the cutting diameter determined by the distance between the outer surface of the sizing guide pad and the outer surface of the cutting blade, and the axial lengths of the guide surfaces of the bearing guide pad and the sizing guide pad are both not larger than the axial length of the circle land of the cutting blade, the axial length of the circle land of the cutting blade is not larger than the diameter of the reamer, and the width of the sizing guide pad is not larger than the width of the bearing guide pad.

10. A reamer as defined in claim 9, wherein said cutting blade includes axial and radial rake angles in the range of −6° to 10°.

* * * * *

UNITED STATES PATENT AND TRADEMARK OFFICE
CERTIFICATE OF CORRECTION

PATENT NO. : 5,238,335
DATED : August 24, 1993
INVENTOR(S) : Takuji Nomura

It is certified that error appears in the above-identified patent and that said Letters Patent is hereby corrected as shown below:

On the title page, item [73] should read as follows:

[73] Assignee: Toshiba Tungaloy Co., Ltd., Kanagawa, Japan, and
Unitac Incorporated, Hyogo-ken, Japan Signed and Sealed this First Day of February, 1994

Attest:

BRUCE LEHMAN

*Attesting Officer*   *Commissioner of Patents and Trademarks*